United States Patent [19]

Nebon et al.

[11] Patent Number: 4,549,242

[45] Date of Patent: Oct. 22, 1985

[54] MOLDED CASE CIRCUIT BREAKER WITH COOLING AND PROTECTION FOR THE STATIC TRIPPING UNIT

[75] Inventors: Jean-Pierre Nebon, Grenoble; Pierre Barnel, Echirolles; Robert Denis, Grenoble; Claude Bertrand, Jarrie, all of France

[73] Assignee: Merlin Gerin, Grenoble, France

[21] Appl. No.: 385,871

[22] Filed: Jun. 7, 1982

[30] Foreign Application Priority Data

Jun. 5, 1981 [FR] France ............................... 81 11354

[51] Int. Cl.$^4$ ............................................. H02H 7/22
[52] U.S. Cl. ........................................ 361/115; 361/1;
361/379; 361/381; 200/306
[58] Field of Search .................. 361/115, 42, 45, 114,
361/1, 379, 381, 383, 384; 339/14 P, 222;
200/306, 305, 304

[56] References Cited

U.S. PATENT DOCUMENTS

| | | | |
|---|---|---|---|
| 3,201,654 | 8/1965 | Clark et al. | 361/383 X |
| 3,761,776 | 9/1973 | Willard | 361/115 X |
| 3,851,944 | 12/1974 | Ganzert et al. | 339/222 X |
| 4,038,618 | 7/1977 | Gryctko | 361/115 X |
| 4,118,753 | 10/1978 | Vind | 361/383 X |
| 4,209,817 | 6/1980 | McGinnis | 361/94 |
| 4,281,359 | 7/1981 | Bayer | 361/115 |

OTHER PUBLICATIONS

Research Disclosure (Jan. 1980), No. 189, 18908, "Electrical Connector Having Wire Shorting Clip".

Primary Examiner—Patrick R. Salce
Attorney, Agent, or Firm—Parkhurst & Oliff

[57] ABSTRACT

This invention concerns a multi-pole circuit breaker with molded case and static tripping unit, comprising an electronic device to process the signals delivered by current transformers associated with each pole, which electronic processing device is part of a subassembly inserted in a compartment of the molded case and delivers a tipping signal to a tripping coil in the case of an overload or a short-circuit. A feature of the circuit breaker according to the invention is that the aforementioned compartment is sealed off from the rest of the inside of the molded case and is in open communication with the ambient atmosphere by means of ventilation holes provided in the outer walls protected from the circuit-breaking gases generated inside the casing and is cooled down by the air circulating through these ventilation holes, while the aforementioned current transformers are housed in the other separate part of the casing.

3 Claims, 5 Drawing Figures

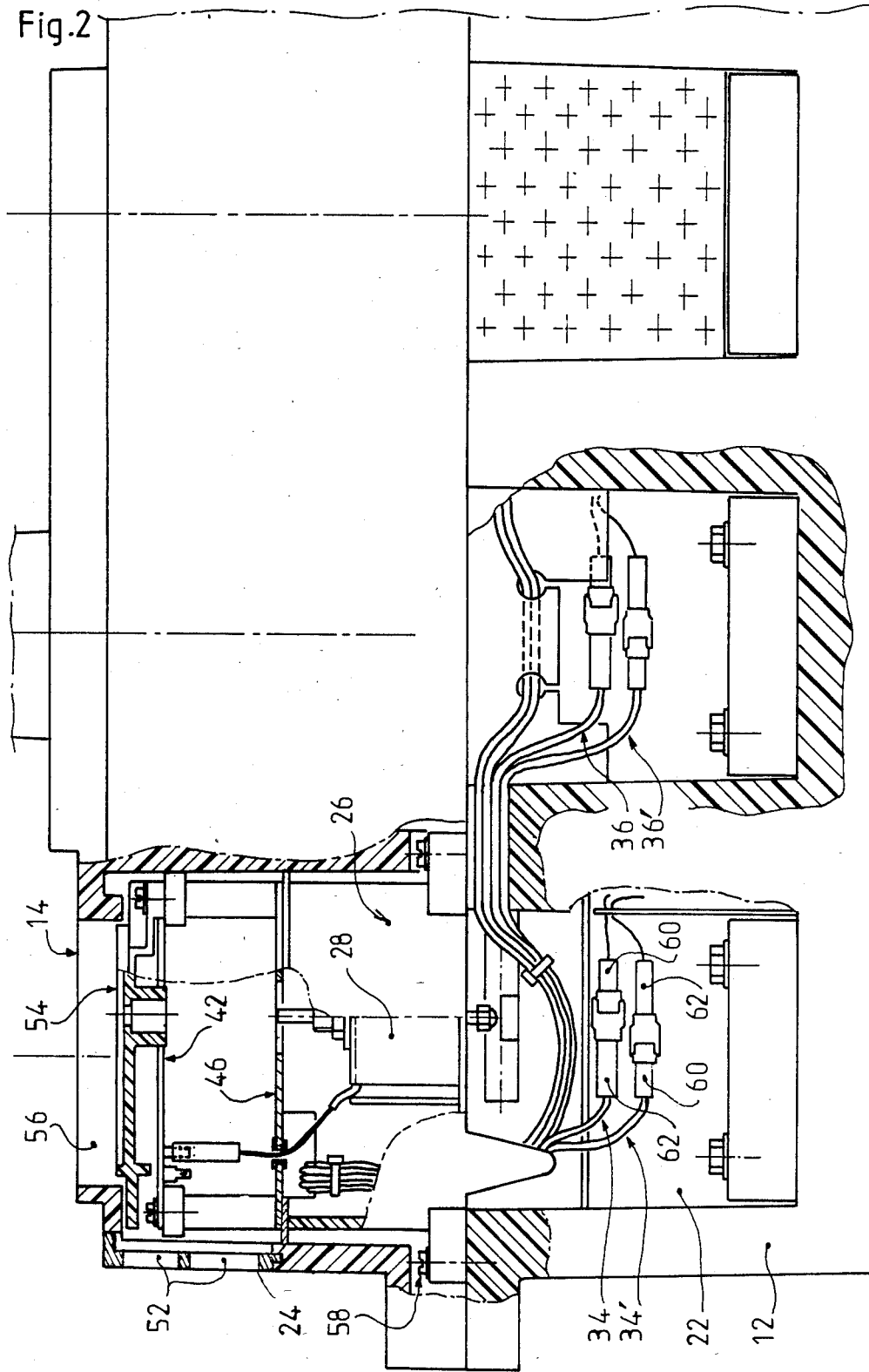

MOLDED CASE CIRCUIT BREAKER WITH COOLING AND PROTECTION FOR THE STATIC TRIPPING UNIT

BACKGROUND OF THE INVENTION

This invention concerns a multi-pole circuit breaker with molded case and static tripping unit, comprising an electronic device to process the signals delivered by current transformers associated with each pole, which electronic processing device is part of a subassembly inserted in a compartment of the molded case and delivers a tripping signal to a tripping coil in the case of an overload or a short-circuit.

A prior art circuit breaker of this kind comprises a sealed housing for the electronic part of the static tripping unit, which housing is lodged in removable fashion inside the molded case of the circuit breaker. The housing is sealed so that none of the circuit breaking gases can penetrate to damage the electronic part inside the housing. The housing is located near the circuit breaker current transformers and power conductors and is subjected to considerable heating that may affect the correct operation of the tripping unit.

The aim of this invention is to eliminate this disadvantage and to provide a static circuit breaker that will operate reliably in all circumstances.

SUMMARY OF THE INVENTION

A feature of the circuit breaker according to the invention is that the aforementioned compartment is sealed off from the rest of the inside of the molded case and is in open communication with the ambient atmosphere by means of ventilation holes provided in the outer walls of the case so that the aforementioned electronic processing device is protected from the circuit-breaking gases generated inside the casing and is cooled down by the air circulating through these ventilation holes, while the aforementioned current transformers are housed in the other separate part of the casing.

Due to the sealed separation between the electromechanical and the electronic parts of the circuit breaker, the electronics are protected from any contamination resulting from current breaking and heating through conduction and convection is reduced. Since the compartment is in open communication with the surrounding air, natural convection provides efficient cooling and any heating of the electronics is avoided. The ventilation holes can naturally be equipped with filters or any other system to prevent any ingress of particles into the afornentioned compartment.

According to one development of the invention, the electronic subassembly comprises a partition constituting the sealed barrier between the compartment and the rest of the inside of the casing. In this case it is useful to include the tripping relay in the said subassembly by placing this relay on the circuit breaker side of the partition. In this way any mechanical transmission is avoided between the compartment housing the static tripping unit and the rest of the inside of the casing.

According to a further development of the invention, the static tripping unit subassembly has a removable mounting and comprises connecting conductors to the circuit breaker current transformers, fitted with connection devices. An important feature of the invention is that these connection devices are designed so that they can short-circuit the current transformer and secondly with a one-way plug-in to ensure fail-safe connecting up of the subassembly. When the subassembly is removed, the current transformers are short-circuited to protect the fitters from any danger of electrocution and to eliminate any risk of overvoltages destroying these current transformers. Consequently, changing the subassemblies is a simple and absolutely safe operation.

Other advantages and features will be obvious from the following description of an embodiment of the invention, given as a non exhaustive example and illustrated as such on the attached drawings, in which:

BRIEF DESCRIPTION OF THE DRAWINGS

FIG. 2 is a part cross-section of a side view along II—II in FIG. 1;

DETAILED DESCRIPTION OF A PREFERRED EMBODIMENT

Figure 1:
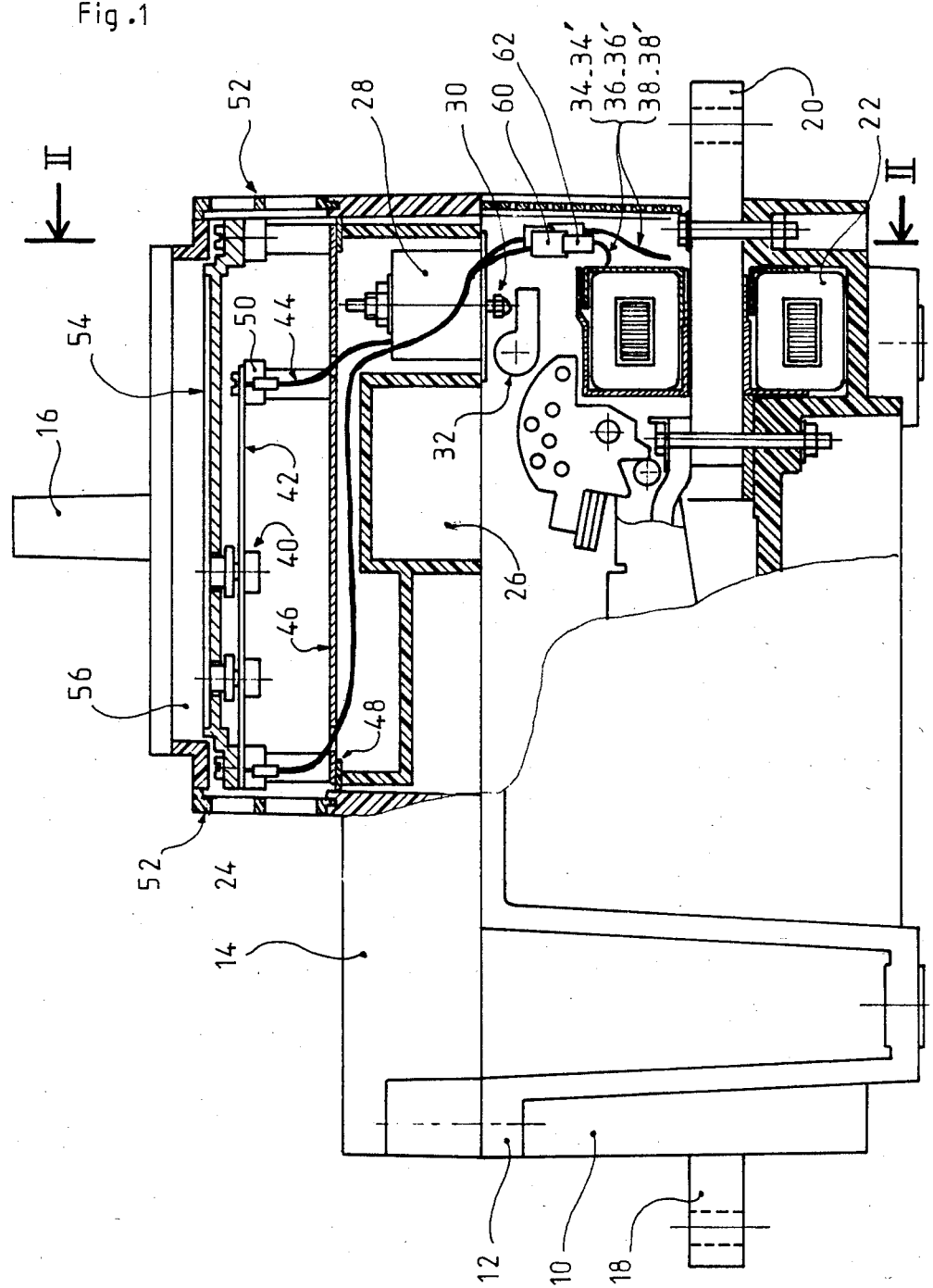
FIG. 1 is a schematic elevation view of a partly opened up circuit breaker equipped with a static tripping unit according to the invention.

On the figures, a molded case (10) of a low voltage multipole circuit breaker is made up of a base (12) and a cover (14) through which a manual control lever (16) is inserted. Inside case (10) there are three poles but only their input (18) and output (20) strips are visible on the figures. Each output (20) strip or output (20) conductor passes through a toroid-shaped current transformer (22), the secondary winding of which delivers a signal representing the value of the current flowing through the pole. Inside moled case (10) and next to output strips (20) a compartment (24) is provided to house a static tripping unit subassembly, identified by general reference number 26. In the example illustrated by the figures, compartment (24) takes up only that part of the width of case (10) corresponding to one of the end poles in order to leave the space in the center available for the circuit breaker control mechanism. Tripping subassembly (26) comprises a tripping relay (28), for instance a biased relay, with an armature or plunger core (30) that cooperates with a tripping rod (32). The three current transformers (22) of the three circuit breaker poles are connected by three pairs of conductors, (34—34', 36—36'), and (38—38'), to an electronic processing device with components (40) mounted on an insulating support in the form of a board (42). The processing device delivers a tripping signal to tripping relay (28) via conductors (44).

This kind of circuit breaker is familiar to specialists of the art and will not be further described here, except to recall that the electronic processing device delivers an automatic tripping signal to the circuit breaker in the case of an overload and/or short circuit detected by current transformers (22). The processing device may include, for instance, a short time tripping circuit to instigate tripping in the event of a short-circuit and a long time circuit which is operative in the event of prolonged overload.

According to this invention, subassembly (26) comprises a partition (46), the circumference of which fits tightly with the walls of case (10), for instance by means of a flexible seal (48) inserted around the periphery, so as to form a sealed separation between compartment (24) and the rest of the inside of molded case (10). Board (42) carrying the electronic processing device is placed in compartment (24) while tripping relay (28) is placed on the opposite side of partition (46) inside molded case (10). Sealed lead-throughs are provided in partition (46) for conductor (44) and for conductors (34 to 38) connecting up the current transformers (22). Board (42) is supported on columns (50) at a distance from partition (46) in order to ensure an unhindered flow of the cooling air entering compartment (24) through the ventilation holes (52) provided in the outer walls of case (10) at the level of compartment (24). Subassembly (26) has a top plate (54) at a distance from board (42) which, when cover (14) is closed, is positioned opposite an opening (56) provided in the top of cover (14). This top plate (54) can be fitted with means of adjustment and indicators of the static tripping unit. Subassembly (26) constitutes a removable part that can be installed and fastened to base (12) by means of screws (58) after taking off cover (14). Connecting conductors (34 to 38) are naturally equipped with a connecting device as described in detail below. Cover (14) adjusts onto partition (46) that seals off compartment (24) from the inside of the molded case (10) containing the electromechanical part of the circuit breaker.

It is obvious that the sealed partition (46) will prevent any contamination of the electronic components on board (42) by the circuit breaking gases, and that this sealed partition (46) will moreover reduce the transfer of heat released by current transformers (22) and by conducting parts, in particular by output strips (20). Ventilation holes (52) provide an unhindered flow of air in compartment (24) and convection cooling of the electronic processing device thereby ensuring operating reliability and unaltered tripping characteristics. The size of ventilation holes (52) may be chosen small enough to prevent any ingress of impurities inside compartment (24) or grilles or filters can be used in conjunction with these ventilation holes. The sole communication between compartment (24) and the rest of the inside of the casing consists of connecting conductors (44) and (34 to 38) and there is no difficulty in providing them with sealed lead-throughs. The static tripping unit constitutes a removable and readily interchangeable subassembly (26) after taking off cover (14).

Figure 3:
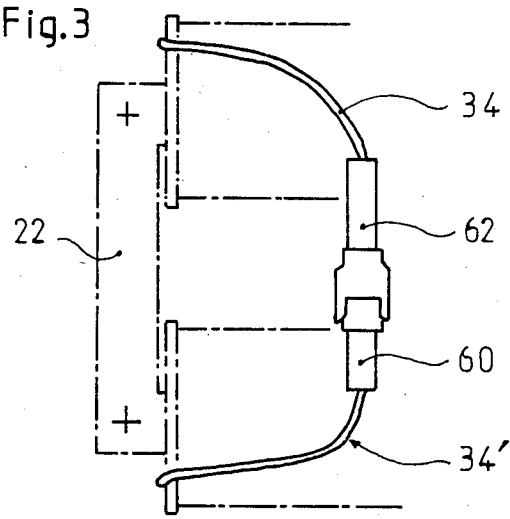
FIG. 3 is a detail view showing a connection short-circuiting a current transformer of the circuit-breaker as illustrated in FIG. 1.

Referring more particularly to FIGS. 2 and 3, connecting conductors (34 to 38) are shown to have each a snap connector made up of a male end (60) fitting onto a female end (62). According to an important feature of the invention, the two conductors, such as (34—34'), of a current transformer (22) are equipped one with a male end (60) and the other with a female end (62) in such a way that the current transformer (22) can be short-circuited when the static tripping unit (26) has been disconnected (see FIG. 3). The connection of output and input conductors (34—34') of current transformer (22) by snap-fitting connectors (60, 62) prevents any burnout of the current transformer and any danger of electrocution for the fitters once subassembly (26) has been removed. This connecting system also avoids any error on connecting up when the static tripping unit is mounted and so constitutes a one-way fail-safe plug-in feature. Connectors (60, 62) can be chosen from any of the types available on the market and FIGS. 4 and 5 simply illustrate one embodiment of a connector presenting this dual function of one-way fail-safe connecting up and short-circuiting.

Figure 4:
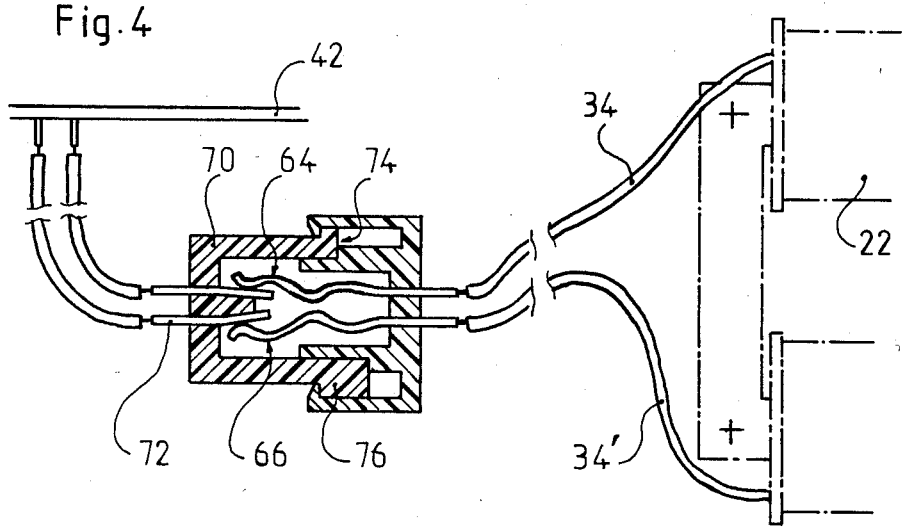
FIGS. 4 and 5 show a connection device, with the static tripping unit respectively connected to and disconnected from the current transformers.
Figure 5:
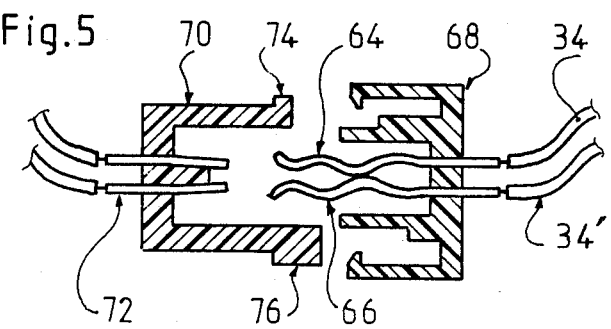

Referring to FIGS. 4 and 5, conductors (34—34') are shown to be connected to two straps (64, 66) of a terminal plate (68) into which an associated terminal plate (70) can be plugged. Associated terminal plate (70) has a plug (72) that, when plugged in, is inserted between straps (64, 66) that cooperate with the conducting parts provided on the corresponding surfaces of plug (72). Terminal plates (68, 70) have dissymmetrical mechanical snap-fitting parts that permit only a predetermined plugging-in position. It is obvious that in the disconnected position, illustrated on FIG. 5, straps (64, 66) come into contact and short-circuit current transformer (22), whereas in the connected position, illustrated on FIG. 4, these straps are forced apart and each is connected to its corresponding conductor on terminal plate (70) thereby connecting up current transformer (22) and the aforementioned electronic processing device. Due to the dissymmetry of the mechanical connecting parts (74, 76) an error in connecting up is not possible, any other embodiment achieving this same end being, of course, equally possible. Each conductor pair, (34—34', 36—36', 38—38'), is, of course, equipped with the same connection system, while the terminal plate may be common or particular to each pair of connecting conductors.

Naturally, the invention is in no way restricted to the embodiment described in more detail herein and illustrated in the attached drawings.

What is claimed is:

1. Multi-pole circuit breaker having a molded case and a static tripping unit, comprising:
   current transformers associated with each pole of the circuit breaker and delivering signals representing the value of the currents flowing through the poles,
   an electronic processing device of said signals which delivers a tripping signal in the case of an overload or a short-circuit,
   a tripping coil controlled by said tripping signal for tripping said circuit breaker,
   a compartment provided in said molded case and sealed off from the rest of the inside of the molded case,
   ventilation holes provided in said case for communication of said compartment with the outside of the moled case, said electronic processing device being inserted in said compartment so that it is protected from the circuit-breaking gases generated inside the case and is cooled down by the air circulating through the ventilation holes, said current transformers being housed in the said rest of the inside of the molded case.

2. Circuit breaker according to claim 1, comprising a partition wall for sealing off the compartment from the rest of the inside of the molded case, said electronic processing device being rigidly secured to the partition wall for constituting a removable subassembly and said tripping coil being placed on the partition wall side opposite to the compartment.

3. A multi-pole circuit breaker comprising:
   a molded case forming a housing, said case being constructed and arranged to have a partition which divides the case into at least two compartments within said housing which are sealed from one another;
   multiple circuit breaker poles mounted within and enclosed by one of said compartments and having input and output portions extending through and external to said housing;

means associated with each pole for interrupting current flow between the input and output portions of each pole and including a static tripping unit subassembly including a tripping relay coupled within and enclosed by said one compartment, said tripping relay being constructed and arranged to cause interruption of current flow through said poles in response to a tripping signal;

a current transformer associated with each of said poles and coupled within and enclosed by said one compartment adjacent its associated pole to provide a current signal representing a value of current flowing through its associated pole;

an electronic processing means coupled within and enclosed by the other of said compartments and responsive to said current signals for providing a tripping signal in response to short circuit and overload conditions at said poles;

means for coupling said tripping signal from said processing means to said tripping relay for causing an interruption of current flow through said poles, said means for coupling said triping signal extending between said one and said other compartment and being sealed to prevent communication between said one and said other compartment;

at least one ventilation hole extending through said housing and communicating with said other compartment providing an opening external of said casing such that air external to said casing may circulate to within said other compartment for cooling said electronic processing means; and said one compartment being filled with circuit-breaking gases and said partition sealing said one compartment from said other compartment being constructed and arranged such that said circuit-breaking gases are retained solely within said one compartment and said partition further being constructed and arranged to reduce heat flow from said one compartment to said other compartment.

* * * * *